United States Patent
Sharma et al.

(10) Patent No.: US 12,244,710 B2
(45) Date of Patent: Mar. 4, 2025

(54) SECURE ONBOARDING OF EXTERNAL COMPUTE FABRIC IN AN EDGE HORIZONTAL PLATFORM

(71) Applicant: Dell Products L.P., Round Rock, TX (US)

(72) Inventors: Anurag Sharma, Cedar Park, TX (US); Daniel Cummins, Hudson, NH (US); Linwood Zoller, IV, Lexington, KY (US)

(73) Assignee: Dell Products L.P., Round Rock, TX (US)

( * ) Notice: Subject to any disclaimer, the term of this patent is extended or adjusted under 35 U.S.C. 154(b) by 311 days.

(21) Appl. No.: 17/730,629

(22) Filed: Apr. 27, 2022

(65) Prior Publication Data

US 2023/0353359 A1 Nov. 2, 2023

(51) Int. Cl.
*H04L 29/00* (2006.01)
*H04L 9/14* (2006.01)
*H04L 9/40* (2022.01)

(52) U.S. Cl.
CPC .............. *H04L 9/14* (2013.01); *H04L 63/061* (2013.01)

(58) Field of Classification Search
CPC ....... H04L 9/14; H04L 63/061; H04L 9/0894; H04L 9/3263; H04L 63/0442
See application file for complete search history.

(56) References Cited

U.S. PATENT DOCUMENTS

| | | | |
|---|---|---|---|
| 9,240,981 B2 * | 1/2016 | Johnsen | H04L 9/3271 |
| 9,612,900 B2 | 4/2017 | Anderson et al. | |
| 2003/0163692 A1 * | 8/2003 | Kleinsteiber | H04L 63/104 |
| | | | 713/169 |
| 2020/0034353 A1 * | 1/2020 | Innocenti | H04L 9/50 |
| 2021/0132680 A1 | 5/2021 | Sika | |
| 2023/0185894 A1 * | 6/2023 | Sorensen | H04L 9/3073 |
| | | | 726/7 |

* cited by examiner

*Primary Examiner* — Ghazal B Shehni
(74) *Attorney, Agent, or Firm* — Larson Newman, LLP (57) ABSTRACT

An edge processing system includes first and second information handling systems. The first information handling system orchestrates the edge processing system, and creates a first key pair including a first private key and a first public key. The second information handling system receives fabric agent code that includes the first public key, a second key pair including a second private key and a second public key, and an address of the first information handling system. The second information handling system executes the fabric agent code to provide an access request to the address. The access request is encoded with the first public key. The first information handling system authenticates the access request with the first private key, and provides external compute fabric code to the second information handling system in response to authenticating the access request. The second information handling system instantiates the external compute fabric code to manage end points of the edge processing system.

20 Claims, 3 Drawing Sheets

SECURE ONBOARDING OF EXTERNAL COMPUTE FABRIC IN AN EDGE HORIZONTAL PLATFORM

FIELD OF THE DISCLOSURE

This disclosure generally relates to information handling systems, and more particularly relates to secure onboarding of an external compute fabric in an edge horizontal platform.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An edge processing system may include a first information handling system that orchestrates the edge processing system, and creates a first key pair including a first private key and a first public key. A second information handling system may receive fabric agent code that includes the first public key, a second key pair including a second private key and a second public key, and an address of the first information handling system. The second information handling system may execute the fabric agent code to provide an access request to the address. The access request may be encoded with the first public key. The first information handling system may authenticate the access request with the first private key, and provide external compute fabric code to the second information handling system in response to authenticating the access request. The second information handling system may instantiate the external compute fabric code to manage end points of the edge processing system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
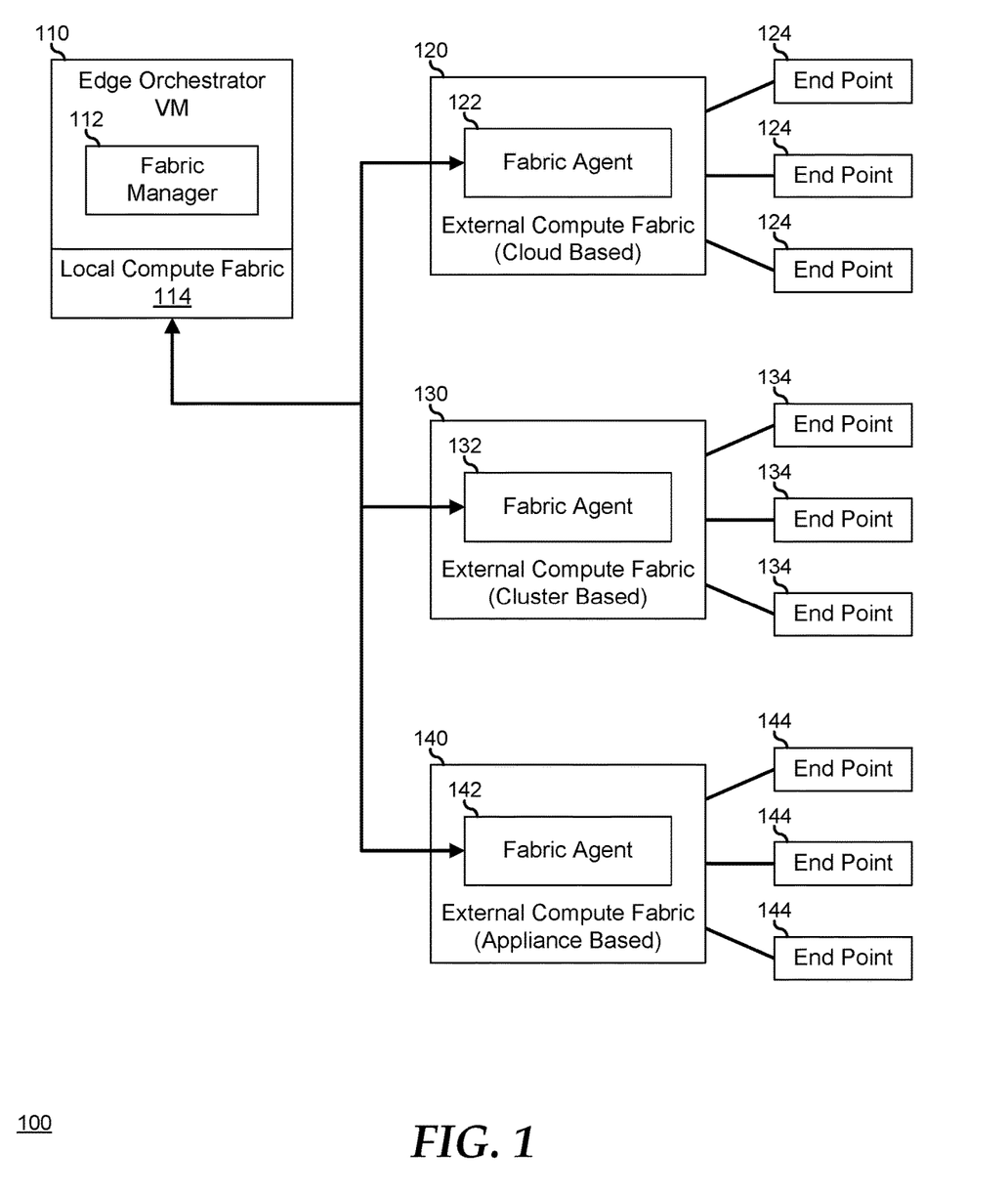
FIG. 1 is a block diagram illustrating a data communication network according to an embodiment of the current disclosure.

FIG. 1 illustrates an edge computing system 100. Edge computing system 100 represents a computing system in which data and the data processing tasks associated with the data are distributed to processing nodes that are closer to the end user devices (end points 124, 134, and 144, described below) that are networked to the edge computing system, rather than having the data and processing tasks provided at a more centralized location, such as a datacenter or in "the cloud." Edge computing system 100 may thus be associated with various latency-sensitive applications and processes such as autonomous vehicle systems, remote surgeries, or the like. Examples of edge computing system 100 may include networks provided by communication service providers that are implementing fifth-generation (5G) wireless data communication networks, remote sensing networks, manufacturing automation networks, or the like. Edge computing system 100 may be understood to utilize a horizontal platform model, where the communication service provider's applications are configured and distributed based upon a common platform that is independent of the underlying hardware, rather than a vertical platform model where different infrastructure is provided in the various processing levels, from the core to the end user devices. As such, edge computing system 100 will be understood to be rapidly scalable as the demands for processing services increases.

Edge processing system 100 includes an edge orchestrator system 110, and external compute fabrics 120, 130, and 140. External compute fabrics 120, 130, and 140 each provide the data processing tasks of edge processing system 100 for associated end points 124, 134, and 144. Edge orchestrator system 110 is implemented on a local fabric 114 that represents a scalable compute environment. As such, edge orchestrator system 110 may represent one or more virtual machines instantiated by a hypervisor or virtual machine manager on one or more information handling systems, one or more containerized workloads implemented on one or more information handling system, one or more utilities, processes, programs, applications, Application Programming Interfaces (APIs) or other elements instantiated one or more stand-alone information handling system, or in a cloud-based processing environment, or the like. As such, local fabric 114 may be air-gapped from the other elements of edge processing system 100, intermittently connected to the other elements, or permanently connected, as needed or desired.

Edge orchestrator system 110 operates to provide for automated monitoring, management, and maintenance of the various systems and applications within edge processing system 100. As such, edge orchestrator system 110 includes a fabric manager 112 that operates to monitor, manage, and maintain external compute fabrics 120, 130, and 140, as described further below. It will be understood that, as opposed to the monitoring, management, and maintenance of servers and processes in, e.g., a datacenter, the highly distributed nature of edge processing system 100 necessitates a much more involved process for monitoring, managing, and maintaining the elements of the edge processing system, including external compute fabrics 120, 130, and 140. Moreover, edge orchestrator 110 may operate to provide for automated monitoring, management, and maintenance of end points 124, 134, and 144, as needed or desired.

External compute fabrics 120, 130, and 140 each represent a scalable compute environment for providing the processing functions and features of edge processing system 100, as needed or desired. As such, external compute fabrics 120, 130, and 140 may represent one or more virtual machines instantiated by a hypervisor or virtual machine manager on one or more information handling systems, one or more containerized workloads implemented on one or more information handling system, one or more utilities, processes, programs, applications, Application Programming Interfaces (APIs) or other elements instantiated one or more stand-alone information handling system, or in a cloud-based processing environment, or the like.

The processing functions and features of external compute fabrics 120, 130, and 140 may include compute functions, storage functions, data protection functions, network functions or the like for respective end points 124, 134, and 144, and may include data processing and analytics, artificial intelligence/machine language (AI/ML) processing, or other processing capabilities as needed by the end points. External compute fabric 120 represents a cloud-based fabric, such as an Amazon Web Services (AWS) platform, an Oracle Cloud Infrastructure platform, a Microsoft Azure platform, or the like. External compute fabric 130 represents a cluster-based fabric, such as a VMware VSphere platform or other cluster-based fabric, and may be understood to include a highly containerized operations such as a Docker platform, a Kubernetes platform, or the like. External compute fabric 140 represents an appliance-based fabric, such as a stand-alone information handling system or application specific fabric, as needed or desired.

As used herein, a fabric represents an aggregated processing system configured to form pooled resources provided to the use of the entire processing system. A fabric may be understood to represent a flatter topology than a traditional datacenter or virtualized environment, where all of the elements of the fabric can directly obtain access to the pooled resources. In contrast, the typical datacenter exhibits a hierarchical topology with the various functions such as storage capacity, compute capacity, network capacity, and the like, siloed off from the other functions. As such, a fabric may be understood to be more easily scaled to meet the increased demands for the services of the fabric. In this regard a fabric-based system, such as edge processing system 100, is highly suited to a 5G rollout and expanded use of Internet-of-things (IoT) based end points 124, 134, and 144.

External compute fabrics 120, 130, and 140 each include respective fabric agents 122, 132, and 142. Fabric agents 122, 132, and 142 represent code executed on respective external compute fabrics 120, 130, and 140, such as a program, an application, a widget, a utility, a service, a process, a BIOS/UEFI call, or other code configured to provide a secure link between the associated external compute fabric and edge orchestrator system 110. In this regard, fabric agents 122, 132, and 142 are each provided in accordance with the requirements and usages of the respective external compute fabrics 120, 130, and 140. For example, fabric agent 122 may represent various scripted service calls to the services provided by external compute fabric 120, fabric agent 132 may represent one or more Helm chart that describe a related set of Kubernetes resources instantiated on external compute fabric 130, or fabric agent 142 may represent an Oracle VM Appliance (OVA) instantiated on a vSphere-based external compute fabric like external compute fabric 140.

Fabric agents 122, 132, and 142 provide a secure channel with edge orchestrator system 110 that permits FIDO-based placement and execution of the fabric agents. Once placed on respective external computer fabrics 120, 132, and 140, fabric agents 122, 132, and 142 extend the secure communications with edge orchestrator system 110 for the secure monitoring, management, and maintenance of the elements of the external compute fabrics related to respective end points 124, 134, and 144. For example, fabric agents 122, 132, and 142 may monitor the operations of respective external compute fabrics 120, 130, and 140, such as by monitoring error status, performance status, feature status, security status, and the like. Further, fabric agents 122, 132, and 142 may manage the operations of respective external compute fabrics 120, 130, and 140, such as by enabling or disabling features of the external compute fabrics, providing load balancing between elements of the external compute fabrics, adding or removing applications, and the like. Moreover, fabric agents 122, 132, and 142 may maintain respective external compute fabrics 120, 130, and 140, such as by pushing or pulling software, firmware, or other updates to the external compute fabrics and associated end points 124, 134, and 144.

Fabric agents 122, 132, and 142 may provide functions and features similar to the functions and features of edge orchestrator system 110, as needed or desired. However, being collocated with, or instantiated on external compute fabrics 120, 130, and 140, the functions and features of fabric agents 122, 132, and 142 are streamlined to the specific operating environment provided by the external compute fabrics. Further, by offloading some of the functions and features of edge orchestrator system 110 to fabric agents 122, 132, and 142, the network bandwidth between the edge orchestrator system and the fabric agents is reduced, and the edge orchestrator can request periodic updates from the fabric agents, rather than needing to be constantly updated with the status of external compute fabrics 120, 130, and 140. Fabric agents 122, 132, and 142 operate whether or not the secure connection with edge orchestrator system 110 is maintained at all times. In this way, the monitoring, management, and maintenance of edge processing system 100 can be scaled at external compute fabrics 120, 130, and 140, and the demands for those external compute fabrics increase, rather than necessitating the scaling of edge orchestrator system 110 itself.

A major challenge in implementing edge processing system 100 involves the scalability of the architecture to handle the constant growth in the number of connected devices (that is, end points 124, 134, and 144), and in the bandwidth and processing demands of the connected devices. In particular, edge processing system 100 is implemented with an eye toward the onboarding by edge orchestrator system 110 of additional external compute fabrics, including the provision of greater numbers of existing external compute fabrics like external compute fabrics 120, 130, and 140, and increasing the capacities and capabilities of the existing external compute fabrics. Additionally, the onboarding of completely new external compute fabric architectures needs to be seamlessly managed by edge orchestrator 110.

Traditional methods for onboarding of external compute fabrics typically involve API based access by the external compute fabrics to resources of the edge orchestrator system, such as by accessing a URL associated with the edge orchestrator system with the necessary access credentials (username/password, etc.) However, the use of such resources of the edge orchestrator system exposes the entire edge processing system to the security risk of compromised access credentials. Moreover, the use of such access credential-based resources demands that the user or administrator of the external compute fabric be trained and cleared to utilize the onboarding resources of the edge orchestrator system. Even where the external compute fabrics include strong security resources, the passing of the credentials to the edge orchestrator system risks further exposure and imposes additional demands on the edge orchestrator system to securely maintain the associated credentials and to adhere to any rotation policies demanded by the external compute fabric.

In a particular embodiment, an edge processing system utilizes an agent-based architecture for onboarding external compute fabrics into the edge processing system, Here a Fast ID Online (FIDO) based mechanism is utilized to establish a secure conduit between an edge orchestrator system and the external compute fabric to be onboarded. The secure conduit enables the placement of edge applications and the monitoring, management, and maintenance of the external compute fabric for security and availability, as needed or desired.

Figure 2:
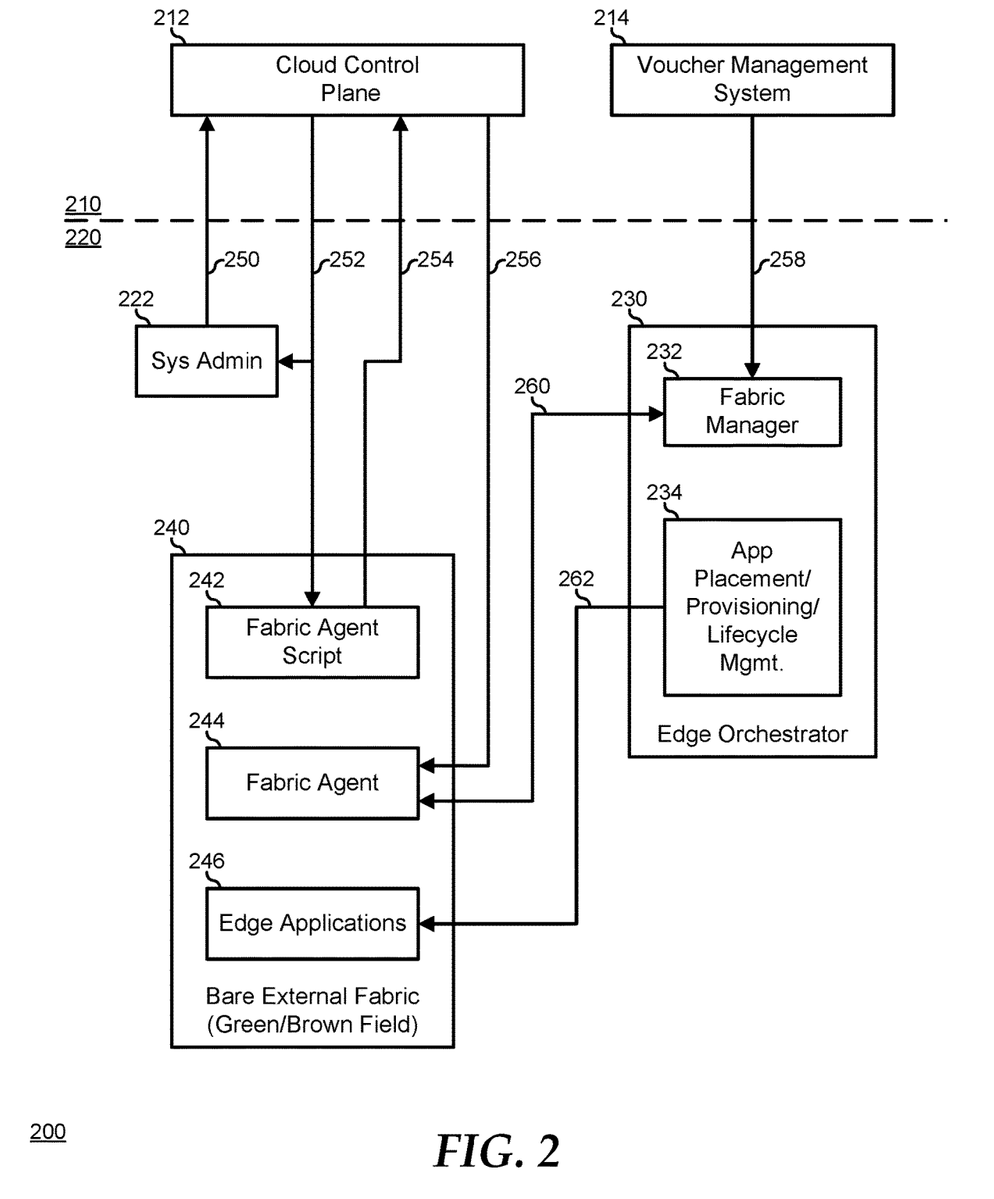
FIG. 2 is a block diagram illustrating a cluster controller of the data communication network of FIG. 1.

FIG. 2 illustrates an edge processing system 200 similar to edge processing system 100, as described above. Edge processing system 200 includes an edge processing system provisioning site 210 (hereinafter "provisioning site 210"), and an edge infrastructure site 220 (hereinafter "infrastructure site 220"). Provisioning site 210 is a management plane for the provisioning of external compute fabrics within edge processing system 200, and may be understood to represent a dedicated hardware infrastructure, a software infrastructure, or a combination thereof for performing the functions and features as described herein, a cloud-based infrastructure for performing the functions and features, or another type of infrastructure as needed or desired.

As such, provisioning site 210 may be located at a single geographic location, or the functions and features of the provisioning site may be distributed across multiple geographic locations, as needed or desired. Provisioning site 210 may be monitored, managed, and maintained by an entity that owns or operates edge processing system 200, by an entity responsible for the supply of the elements of infrastructure site 220, such as a manufacturer of information handling systems or a software/solution provider for edge processing systems, by another third party responsible for the monitoring, management, and maintenance of edge processing systems, and particularly for credential authentication, such as a credential authority, or by another party, as needed or desired. Provisioning site 210 includes a cloud control plane 212 and a voucher management system 214.

Cloud control plane 212 represents a system for the orchestration of edge processing system 200, and may be understood to be similar to edge orchestrator systems 110 or 230, but with a focus toward setting up the edge processing system, rather than toward monitoring, managing, and maintaining the edge processing system like the edge orchestrator systems. Voucher management system 214 represents an authorization engine that coordinates, for example, commercial aspects of the provisioning of edge processing system 200. For example, voucher management system 214 may provide a certificate authority for verifying aspects of the provisioning and operation of edge processing system 200, as needed or desired.

Infrastructure site 220 includes a system administrator 222, an edge orchestrator system 230, and a bare external fabric 240. In this regard, edge orchestrator system 230 is similar to edge orchestrator system 110 as described above, and bare external fabric 240 represents a set of processing resources that have yet to be configured as an external compute fabric to be monitored, managed, and maintained by the edge orchestrator system. Here, bare external fabric 240 may represent unconfigured processing resources of a cloud-based fabric similar to external compute fabric 120, a cluster-based fabric similar to external compute fabric 130, an appliance-based fabric similar to external compute fabric 140, or another type of processing resource as needed or desired.

FIG. 2 also illustrates a method for onboarding of the elements of an external compute fabric 246 onto bare external fabric 240 in order to configure the bare external fabric to participate in edge processing system 200 under the control of edge orchestrator system 230. Here, bare external fabric 240 may represent a greenfield installation, that is, a newly delivered information handling system or cluster in, e.g., a data center, or a newly allocated set of cloud-based resources, as needed or desired. Bare external fabric 240 may also represent a brownfield installation, that is, the reallocation of a previously installed information handling system or cluster, or the reallocation of previously a previously allocated set of cloud-based resources, as needed or desired. Where bare external fabric 240 represents a greenfield installation, it will be understood that the bare external fabric will have previously been ordered from and manufactured by an information handling system or cluster manufacturer, or have previously been ordered and allocated by a provider of cloud-based resources. Where bare external fabric 240 represents an information handling system or cluster, provisioning site 210 may be provided by the manufacturer of the information handling system or cluster, as needed or desired.

In a first step 250, system administrator 222 accesses cloud control plane 212, initiating the process of onboarding bare external fabric 240 into an external compute fabric within the estate edge processing system 200. Here, if bare external fabric 240 is air-gapped from cloud control plane 212, that is, there is no secure connection between the bare external fabric and the cloud control plane, then cloud control plane 212 prompts system administrator 222 for a URL of edge orchestrator system 230 and an authentication certificate (that is, a public key portion of a public/private key pair) of the edge orchestrator system. On the other hand, if edge orchestrator system 230 is securely connected to cloud control plane 212, then the cloud control plane retrieves the URL and the authentication certificate from voucher management system 214. Cloud control plane 212 then builds and configures fabric agent 244 with an authentication certificate (that is, a public key) for later transmission to edge orchestrator system 230. In a particular embodiment, cloud control plane 212 configures a fabric agent package with fabric agent code, and includes a fabric agent certificate (PKI key pair) for Mutual Transport Layer Security (mTLS) communication between the compute fabric and edge orchestrator system 230. The fabric agent certificate may be signed by an appropriate certificate signing authority. The fabric agent package may further include the URL and the certificate (public key) of edge orchestrator system 230. Here, cloud control plane 212 may upload fabric agent metadata to voucher management system 214 to indicate that bare external fabric 240 is registered to the edge estate. Fabric agent 244 also includes the URL of edge orchestrator system 230. Fabric agent 244 may be similar to one or more of fabric agents 122, 132, and 142, as described above.

If bare external fabric 240 is air-gapped from cloud control plane 212, then the cloud control plane provides fabric agent script 242 (an install script) and fabric agent package to system administrator 222, and the system administrator executes the fabric agent script in a command line interface in bare external fabric 240. In step 254, system administrator 222 places fabric agent package in a network path local and points fabric agent script 242 to that location to install the fabric agent package. Fabric agent script 242 installs the compute fabric and configures the certificate (public key) and URL of edge orchestrator system 230. On the other hand, if bare external fabric 240 is not air-gapped from cloud control plane 212, then the cloud control plane directly downloads fabric agent 244 to the bare external fabric in step 256, foregoing the execution of fabric agent script 242 in step 252.

In step 258, the authentication certificate (public key) of fabric agent 244 is provided to fabric manager 232. Here, if edge orchestrator system 230 is air gapped from cloud control plane 212, then system administrator 222 imports the authentication certificate (public key) of fabric agent 244 to fabric manager 232. Otherwise voucher management system 214 directly downloads the authentication certificate (public key) of fabric agent 244 to fabric manager 232.

In step 260, once fabric agent 244 is installed, because the fabric agent includes the URL and certificate (public key) of edge orchestrator system 230, secure communication is established between the edge orchestrator system and bare external fabric 240. Here, edge orchestrator system 230 has the authentication certificate of fabric agent 244, and so the edge orchestrator system challenges the fabric agent to prove the possession of the private key of the authentication certificate of the fabric agent by signing a nonce with the public key of the fabric agent. Fabric agent 244 decrypts the nonce with its private key and responds back to edge orchestrator system 230. Similarly, fabric agent 244 has the authentication certificate of edge orchestrator system 230, and so the fabric agent challenges the edge orchestrator system to prove the possession of the private key of the edge orchestrator by signing another nonce with the public key of the edge orchestrator system. Edge orchestrator system 230 decrypts the nonce with its private key and responds back to fabric agent 244. In this way, secure, bi-directional communications are established between edge orchestrator system 230 and fabric agent 244.

In step 262, an application placement module 234 downloads edge applications 246 to bare external fabric 240, completing the onboarding of the edge applications solution and registration of the bare external fabric into edge computing system 200. Thereafter, additional provisioning and lifecycle management of edge applications 246 is provided by application placement module 234, and fabric agent 244 operates to monitor, manage, and maintain the functions and features of the edge applications. Here, fabric manager 232 and fabric agent 244 can periodically change their authentication certificates to ensure security of the communications between the fabric manager and the fabric agent.

In this way, the method described implements a FIDO mechanism for zero-trust and zero-touch onboarding of edge applications in an edge processing system, as needed or desired. In particular, as the edge processing system scales, the onboarding process can be performed with minimal effort on the part of a system administrator and minimal training.

Figure 3:
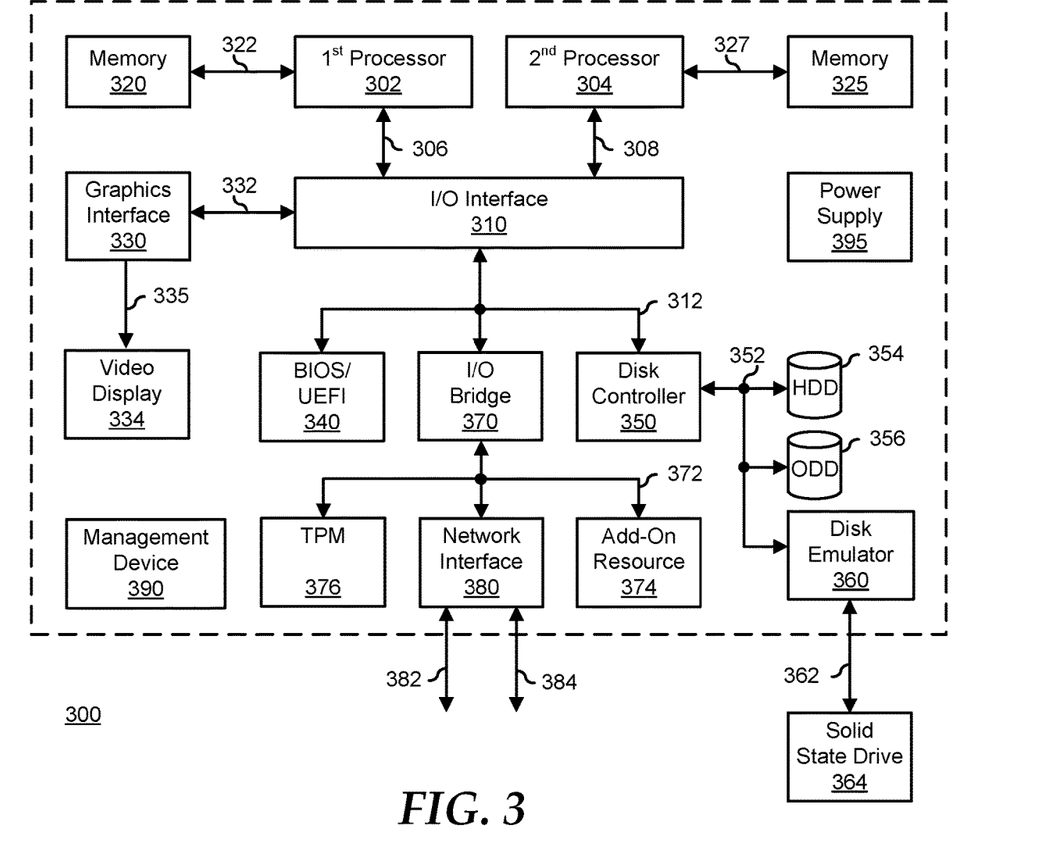
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An edge processing system, comprising:
 a first information handling system including:
  a first processor;
  a first memory storing instructions that, when executed by the first processor, cause the first processor to perform first operations comprising:
   orchestrating the edge processing system; and
   creating a first key pair including a first private key and a first public key;
 a second information handling system including:
  a second processor; and
  a second memory storing instructions that, when executed by the second processor, cause the second processor to perform second operations comprising:
   receiving a fabric agent code, the first public key, a second key pair including a second private key and a second public key, and an address of the first information handling system; and
   executing the fabric agent code to provide an access request to the address;
 wherein the first operations further comprise:
  authenticating the access request with the first private key, and
  providing external compute fabric code to the second information handling system in response to the access request being authenticated;
 wherein the second operations further comprise:
  instantiating the external compute fabric code to manage end points of the edge processing system; and
 wherein secure bidirectional communications based on the first and second key pairs are established between the first and second information handling systems.

2. The edge processing system of claim 1, wherein the access request includes the second public key.

3. The edge processing system of claim 2, wherein providing the external compute fabric code comprises encoding the external compute fabric code with the second public key.

4. The edge processing system of claim 3, wherein prior to instantiating the external compute fabric code, the second operations further comprise authenticating the external compute fabric code with the second private key.

5. The edge processing system of claim 1, further comprising:
 a third processor; and
 a third memory storing instructions that, when executed by the third processor, cause the third processor to function as a cloud control plane and to perform third operations comprising providing the fabric agent code to the second information handling system.

6. The edge processing system of claim 5, wherein prior to the cloud control plane providing the fabric agent code to the second information handling system, the second operations further comprise:
 receiving a fabric agent script from the cloud control plane, and
 executing the fabric agent script, wherein the fabric agent script establishes a secure connection between the second information handling system and the cloud control plane.

7. The edge processing system of claim 6, wherein the fabric agent code is provided to the second information handling system on the secure connection.

8. The edge processing system of claim 5, wherein the third operations further comprise receiving the address and the first public key.

9. The edge processing system of claim 8, wherein the third operations further comprise creating the second key pair.

10. The edge processing system of claim 9, wherein the third operations further comprise adding the first public key and the second key pair to the fabric agent code.

11. A method, comprising:
 creating, on a first information handling system of an edge processing system, a first key pair including a first private key and a first public key, the first information handling system configured to orchestrate the edge processing system;
 receiving, by a second information handling system of the edge processing system, fabric agent code, the first public key, a second key pair including a second private key and a second public key, and an address of the first information handling system;
 executing the fabric agent code to provide an access request to the address;
 authenticating the access request with the first private key;
 providing external compute fabric code to the second information handling system in response to the access request being authenticated;
 instantiating the external compute fabric code to manage end points of the edge processing system; and
 establishing secure bidirectional communications based on the first and second key pairs between the first and second information handling systems.

12. The method of claim 11, wherein the access request includes the second public key.

13. The method of claim 12, wherein providing the external compute fabric code comprises encoding the external compute fabric with the second public key.

14. The method of claim 13, wherein prior to instantiating the external compute fabric code, the method further comprises authenticating the external compute fabric code with the second private key.

15. The method of claim 11, further comprising providing, by a cloud control plane of the edge processing system, the fabric agent code to the second information handling system.

16. The method of claim 15, wherein, prior to providing the fabric agent code to the second information handling system, the method further comprises:
 receiving a fabric agent script from the cloud control plane; and
 executing the fabric agent script, wherein the fabric agent script establishes a secure connection between the second information handling system and the cloud control plane.

17. The method of claim 16, wherein the fabric agent code is provided to the second information handling system on the secure connection.

18. The method of claim 15, further comprising:
receiving, by the cloud control plane, the address and the first public key.

19. The method of claim 18, further comprising:
creating the second key pair; and
adding the first public key and the second key pair to the fabric agent code.

20. An edge processing system, comprising:
a first information handling system including:
a first processor; and
a first memory storing instructions that, when executed by the first processor, cause the first processor to function as a first and to perform first operations comprising:
managing the edge processing system, and
creating a first key pair including a first private key and a first public key;
a second information handling system including:
a first processor; and
a second memory storing instructions that, when executed by the second processor, cause the second processor to perform operations comprising:
receiving a fabric agent code, the first public key, a second key pair including a second private key and a second public key, and an address of the first information handling system, and
executing the fabric agent code to provide an access request to the address;
a cloud control plane including:
a third processor;
a third memory storing instructions that, when executed by the third processor, cause the third processor to perform third operations comprising providing the fabric agent code to the second information handling system;
wherein:
the first operations further comprise:
authenticating the access request with the first private key, and
providing external compute fabric code to the second information handling system in response to the access request being authenticated;
the second operations further comprise:
instantiating the external compute fabric code to manage end points of the edge processing system;
the access request includes the second public key;
in providing the external compute fabric code comprises encoding the external compute fabric with the second public key; and
secure bidirectional communications based on the first and second key pairs are established between the first and second information handling systems.

* * * * *

UNITED STATES PATENT AND TRADEMARK OFFICE
CERTIFICATE OF CORRECTION

PATENT NO. : 12,244,710 B2
APPLICATION NO. : 17/730629
DATED : March 4, 2025
INVENTOR(S) : Anurag Sharma et al.

Page 1 of 1

It is certified that error appears in the above-identified patent and that said Letters Patent is hereby corrected as shown below:

In the Claims

Column 14 Line 19: Please change "in providing" to --providing--

Signed and Sealed this
Eighth Day of April, 2025

Coke Morgan Stewart
*Acting Director of the United States Patent and Trademark Office*